US010204532B2

(12) United States Patent
Christiansen et al.

(10) Patent No.: US 10,204,532 B2
(45) Date of Patent: Feb. 12, 2019

(54) MULTIPLE INPUT CRYPTOGRAPHIC ENGINE

(71) Applicant: Intel Corporation, Santa Clara, CA (US)

(72) Inventors: Ammon J. Christiansen, Hillsboro, OR (US); David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/865,358

(22) Filed: Sep. 25, 2015

(65) Prior Publication Data

US 2017/0092157 A1   Mar. 30, 2017

(51) Int. Cl.
*H04L 9/06* (2006.01)
*G09C 1/00* (2006.01)
*G06F 21/60* (2013.01)

(52) U.S. Cl.
CPC .............. *G09C 1/00* (2013.01); *G06F 21/602* (2013.01); *H04L 9/0618* (2013.01); *H04L 9/0631* (2013.01); *H04L 2209/122* (2013.01)

(58) Field of Classification Search
None
See application file for complete search history.

(56) References Cited

U.S. PATENT DOCUMENTS

| | | | | |
|---|---|---|---|---|
| 7,502,474 B2* | 3/2009 | Kaniz | ................. | H04L 49/90 380/255 |
| 8,155,308 B1* | 4/2012 | Poo | ..................... | H04L 9/0631 380/29 |
| 8,300,805 B1 | 10/2012 | Langhammer | | |
| 8,750,498 B1* | 6/2014 | Poo | ..................... | H04L 9/0631 380/29 |

(Continued)

OTHER PUBLICATIONS

Advanced Encryption Standard (AES), Federal Information Processing Standards Publication 197, Nov. 26, 2001, 51 pages.

(Continued)

*Primary Examiner* — Michael R Vaughan
(74) *Attorney, Agent, or Firm* — Grossman, Tucker, Perreault & Pfleger, PLLC

(57) ABSTRACT

This disclosure is directed to a multiple input cryptographic engine. In general, an cryptographic engine consistent with the present disclosure may improve on existing systems that generate encrypted data (e.g., ciphertext) from decrypted input data (e.g., plaintext), or that conversely generate decrypted data from encrypted data, in that a second input may be received into the cryptographic engine while a first input is still being processed, allowing multiple inputs to be processed concurrently. An example device may include an input interface to receive data into the device, an output interface to output data from the device and cryptographic circuitry. The cryptographic circuitry may be configured encrypt/decrypt data received via the input interface into encrypted/decrypted data while also converting a least a (Continued)

portion of a second input received via the input interface into second encrypted/decrypted data. The encrypted/decrypted data may then be output via the output interface.

22 Claims, 6 Drawing Sheets

(56) References Cited

U.S. PATENT DOCUMENTS

| | | |
|---|---|---|
| 2003/0202658 A1* | 10/2003 | Verbauwhede ....... H04L 9/0631 380/43 |
| 2004/0202317 A1* | 10/2004 | Demjanenko ......... H04L 9/0631 380/28 |
| 2008/0019504 A1* | 1/2008 | Han ...................... H04L 9/0631 380/28 |
| 2008/0031454 A1 | 2/2008 | Verbauwhede |
| 2009/0172390 A1 | 7/2009 | Milliken |
| 2010/0220863 A1* | 9/2010 | Dupaquis .............. H04L 9/0631 380/277 |
| 2013/0142326 A1 | 6/2013 | Asnaashari et al. |
| 2014/0164673 A1 | 6/2014 | Woo et al. |

OTHER PUBLICATIONS

International Search Report and Written Opinion issued in PCT Application No. PCT/US2016/048747, dated Nov. 21, 2016.
International Preliminary Report on Patentability and Written Opinion issued in PCT Application No. PCT/US2016/048747, dated Apr. 5, 2018, 11 pages.

* cited by examiner

MULTIPLE INPUT CRYPTOGRAPHIC ENGINE

TECHNICAL FIELD

The present disclosure relates to data security, and more particularly, to a hardware-based system capable of contemporaneously encrypting or decrypting more than one data input.

BACKGROUND

Electronic data security has become an area of great focus for development as more daily transactions become computerized. Computing devices are constantly being utilized to exchange financial data, personal identification data, etc. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device, that is exchanged with a processor in the computing device, etc. is a major vulnerability.

Device manufacturers, component manufacturers, software developers, etc. continue to try to develop protective measure to combat vulnerabilities. Software-based malware detection and elimination solutions typically operate at the privilege level of an operating system (OS) in the computing device. These solutions may be effective against lower privilege attacks, but may not be able to combat higher-privileged malware like rootkits, do not have the processing power to handle large amounts of data, etc. Hardware-based security systems may be implemented in, for example, an individual integrated circuit (IC) or "chip," a group of chips that cooperate (e.g., a chipset), a system-on-chip (e.g., SoC), etc. These solutions are more difficult to compromise because their functionality is based on programming, architecture, etc. that may be unalterable, may comprise secure onboard memory to store critical data such as keys, etc. Moreover, many hardware-based security solutions are dedicated to a single purpose with all required processing resources being available onboard, and thus, may be capable of handling larger amounts of data. For example, dedicated hardware-based solutions may be configured to load protective software at device initiation, check applications for malware prior to allowing the programs to be loaded, encrypt and/or decrypt data, etc. However, as system components (e.g., processors) become faster, hardware-based security solutions must also evolve so as not to become bottlenecks.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
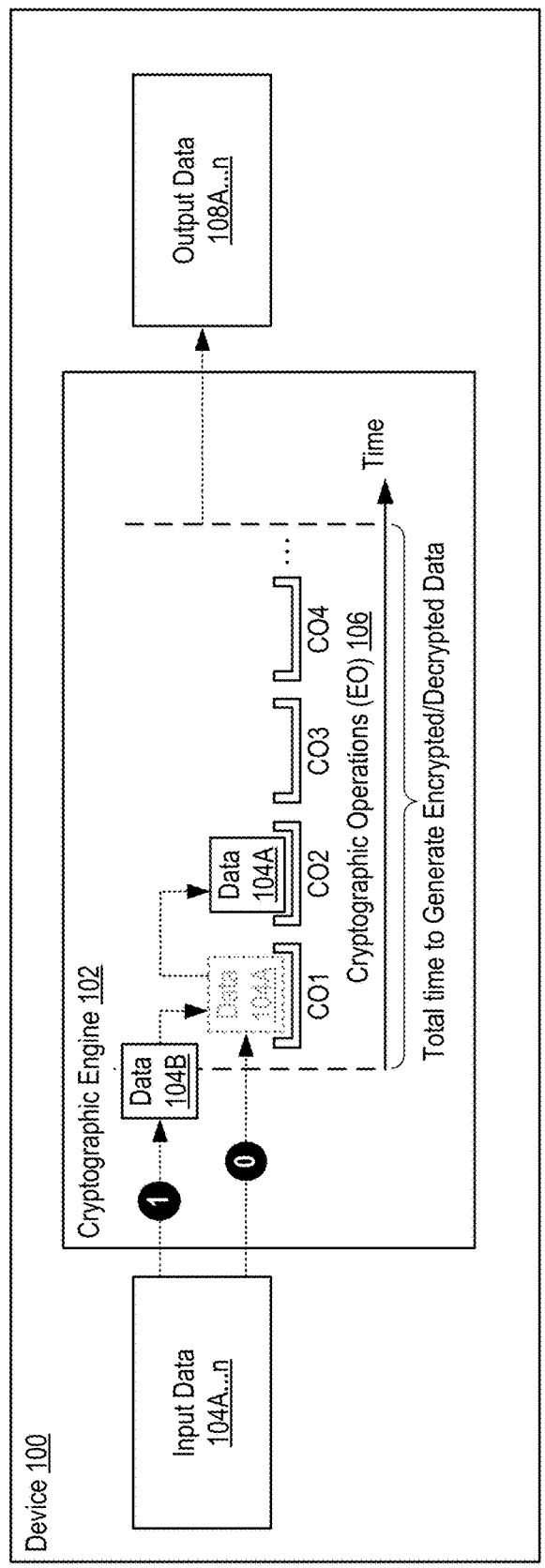
FIG. 1 illustrates an example device comprising a multiple input cryptographic engine in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a multiple input cryptographic engine. In general, an cryptographic engine consistent with the present disclosure may improve on existing systems that generate encrypted data (e.g., ciphertext) from decrypted input data (e.g., plaintext), or that conversely generate decrypted data from encrypted data, in that a second input may be received into the cryptographic engine while a first input is still being processed, allowing multiple inputs to be processed concurrently. An example device may include an input interface to receive data into the device, an output interface to output data from the device and cryptographic circuitry. The cryptographic circuitry may be configured encrypt/decrypt data received via the input interface into encrypted/decrypted data while also converting a least a portion of a second input received via the input interface into second encrypted/decrypted data. The encrypted/decrypted data may then be output via the output interface. In at least one embodiment, the cryptographic engine may also be capable of conserving power by deactivating one or more unused features.

In at least one embodiment, at least one cryptographic device may comprise, for example, at least an input interface, and output interface and cryptographic circuitry. The cryptographic circuitry may initially be to receive at least first input data and second input data via the input interface and convert the first input data into first encrypted data while also converting at least a portion of the second input data into second encrypted data. The cryptographic circuitry may further be to output at least the first encrypted data and the second encrypted data via the output interface.

In at least one embodiment, the input interface may be to receive at least key data, the first input data and the second input data. The cryptographic circuitry may comprise at least logical operators to generate the first encrypted data by performing a series of logical operations on the first input data based on first key data, and generate the second encrypted data by performing a series of logical operations on the second input data based on second key data. The cryptographic circuitry may further comprise at least data handling resources including at least one data register to allow the cryptographic circuitry to perform a logical operation on the first input data while also performing a different logical operation on the second input data. The encryption device may further comprise key data handling resources to manage the first key data and the second key data and power management circuitry to deactivate at least the key data handling resources when the first key data and the second key data are determined to be the same. In the same or a different implementation, the encryption device may further comprise power management circuitry to deactivate at least one of the logical operators or the data handling resources corresponding to the second input data when the second input data is not received via the input interface.

In at least one embodiment, the device may further comprise at least one additional cryptographic circuitry. The input interface may be to receive at least additional first input data and additional second input data corresponding to each additional cryptographic circuitry and the output interface is to output at least first additional encrypted data and second additional encrypted data corresponding to each additional cryptographic circuitry. The cryptographic device may also comprise power management circuitry to disable at least one additional cryptographic circuitry when the additional first input data and the additional second input data corresponding to the at least one additional cryptographic circuitry is not received. The cryptographic circuitry may further be to receive at least first encrypted data and second encrypted data via the input interface, convert the first encrypted data into first decrypted data while also converting at least a portion of the second encrypted data into second decrypted data and output at least the first decrypted data and the second decrypted data via the output interface.

Consistent with the present disclosure, an example system capable of cryptography may comprise processing circuitry to at least trigger cryptographic operations, memory circuitry to store at least input data and output data and at least one cryptographic device including an input interface, an output interface and cryptographic circuitry to receive at least first input data and second input data via the input interface, convert the first input data into first encrypted data while also converting at least a portion of the second input data into second encrypted data and output at least the first encrypted data and the second encrypted data via the output interface. The cryptographic circuitry in the example system may comprise at least logical operators to generate the first encrypted data by performing a series of logical operations on the first input data based on first key data, and generate the second encrypted data by performing a series of logical operations on the second input data based on second key data, and may further comprise data handling resources including at least one data register to allow the cryptographic circuitry to perform a logical operation on the first input data while also performing a different logical operation on the second input data. The cryptographic circuitry in the example system may also be to receive at least first encrypted data and second encrypted data via the input interface, convert the first encrypted data into first decrypted data while also converting at least a portion of the second encrypted data into second decrypted data and output at least the first decrypted data and the second decrypted data via the output interface. Consistent with the present disclosure, an example method for cryptography may comprise triggering data encryption in at least one device, receiving first input data into the at least one device, determining if second input data input is to be received into the at least one device, if it is determined that the second input data is to be received, receiving the second input data into the at least one device, converting the first input data into first encrypted data while also converting at least a portion of the second input data into second encrypted data and outputting at least the first encrypted data and the second encrypted data from the at least one device.

FIG. 1 illustrates an example device comprising a multiple input cryptographic engine in accordance with at least one embodiment of the present disclosure. Initially, when describing various embodiments consistent with the present disclosure reference may be made to encryption methodologies such as the Advanced Encryption Standard (AES) (e.g., information available at http://csrc.nist.gov/publications/fips/fips197/fips-197.pdf), the components that may make up an AES-based encryption system and the manner in which AES encryption may operate. AES has been employed herein merely to provide a readily comprehensible perspective for understanding various disclosed embodiments, and is not intended to limit implementations to only employing AES. The teachings, systems, methodologies, etc. disclosed herein may be employed to other encryption systems such as those that employ "parallelizable" block cipher modes of operation such as, for example, counter mode (CTR) encryption including Galois counter mode (GCM), etc. Other encryption systems existing now or developed in the future may also benefit from the type of data processing "parallelization" described herein. Moreover, while the following will focus on encryption, consistent with the present disclosure, decryption may be performed in a similar manner by, for example, executing the following encryption operations in reverse order.

Existing cryptographic solutions may receive plaintext input data for encryption and are not able to process additional plaintext data inputs until the existing encryption job is complete. In terms of AES-based encryption chips and chipsets, plaintext input data may take up to ten AES rounds to complete, wherein in each round comprises a logical operation performed on the data to transform it from plaintext to encrypted data. The ten AES rounds may take ten or more system clock cycles to complete (e.g., at least one system clock cycle per round). If the clock frequency is increased, two or more system clock cycles may then be required to complete each round, meaning that at least twenty cycles would be required to fully complete an encryption operation. Data processing in a computing system may be time-sensitive in that prior results (e.g., the generation of encrypted data) must be available at a certain instant based on the clock timing of the device so that it may be passed on to the next processing phase requiring the prior results. Thus, work-around solutions may be required in existing systems to ensure that prior results arrive at their intended destination in the required amount of time. For example, the clock frequency may be cut in half so one AES round can be done one clock cycle instead of one AES round every 2 or more cycles. However, slowing the clock may translate into slower performance system-wide. The slow operation of existing AES cryptographic engines may also be accommodated by incorporating more cryptographic hardware. For example, two AES engines may be implemented in a system, or a single AES engine may be expanded to fully pipeline ten data inputs at once into ten sets of AES cryptographic circuitry. While these options would generate encrypted data without requiring a reduction in clock frequency, both solutions would substantially increase the area (e.g., board space) required to implement data encryption. While acceptable in a larger system, in portable devices real estate may be a scare commodity.

Consistent with the present disclosure, the throughput of hardware-based cryptography may be made to comply with system requirements without using twice or more of the implementation space and not requiring a slower clock rate. By adding a set of pipeline registers after the key schedule and data substitution box (SBOX) logic in the cryptographic engine, AES hardware with substantially the same footprint may produce results for two sets of data by interleaving (e.g., "ping-ponging") the input data back and forth between computations (e.g., logical operations).

FIG. 1 illustrates a simplified conceptual example consistent with various embodiments of the present disclosure. In general, device 100 may be any apparatus that comprises resources configurable to at least receive a data input, process the data and generate an output. Examples of device 100 may include, but are not limited to, a mobile communication device such as a cellular handset or a smartphone based on the Android® OS from the Google Corporation, iOS® or Mac® OS from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing/interface device like the Galaxy Gear® from Samsung, an eyewear form factor computing/interface device like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc.

Example device 100 may include at least cryptographic engine 102. "Engine," as referenced herein, may comprise hardware-based data processing solutions. In at least one embodiment cryptographic engine 102 may be capable of both encryption and decryption as described below. Cryptographic engine 102 may be implemented as a single chip solution (a single IC or SoC) or a multichip solution (e.g., chipset). In general, cryptographic engine 102 may be to receive input data 104A . . . n, to subject input data 104A . . . n to a series of cryptographic operations 106 that result in the generation of output data 108A . . . n. The notation "A . . . n" may indicate that the number of data inputs and corresponding outputs, may vary from actual implementation to implementation depending on, for example, the configuration of cryptographic engine 102, the data encryption/decryption requirements (e.g., required encryption or decryption throughput) of device 100, etc. Input data 104A . . . n may comprise plaintext data, which may simply be classified as readable data upon which encryption will be performed (e.g., unsecured data) or encrypted data (ciphertext). Cryptographic operations (CO) 106 are shown as a series of operations such as, for example, CO1, CO2, CO3, CO4, etc. to represent that input data 104A . . . n may proceed through a series of encryption or decryption operations 106 to generate output data 108A . . . n.

In the example of FIG. 1, a first wave (e.g., arrow labeled "0") of input data 104A . . . n may be received into cryptographic engine 102 followed by a second wave (e.g., arrow labeled "1") of input data 104A . . . n. Data 104A may be received into cryptographic engine 102 during the first wave, followed by data 104B during the second wave. In at least one embodiment, the first and second waves may share the same combinatorial logic on alternate clock cycles. For example, given that cryptographic engine 102 is based on AES, a first sequence of encryption operations 106 may be performed by various cryptographic circuitry (e.g., combinatorial logic including SBOX) may be performed on input data 104A during a first cycle. During a second AES cycle, a second sequence of cryptographic operations 106 (e.g., mix columns, shift rows, add round key, etc.) may be performed on input data 104A, while the first sequence of cryptographic operations 106 may be performed on input data 104B. So instead of waiting ten AES rounds after inputting input data 104A into cryptographic engine 102 to generate output data 108A, and waiting for another ten AES rounds after inputting input data 104B to get output data 108B, input data 104A and input data 104B are received in two subsequent cycles. Output data 108A may be ready after ten cycles, and following the next (eleventh) cycle output data 108B may be ready. As a result, twenty AES rounds are reduced to eleven.

A variety of benefits may be realized through implementing embodiments consistent with the present disclosure. Initially, ten instantiations of cryptographic operations 106 are not required for each input data 104A . . . n like in a fully pipelined design. Moreover, device data cryptographic requirements may be satisfied without experiencing a performance penalty due to reducing the system clock rate or a board/die space penalty from having to instantiate multiple AES engines. Implementations consistent with the present disclosure may be area and power efficient (e.g., leakage power and dynamic power). Conserving energy is increasingly important for server and network operators. Example applications where parallelizable AES encryption may improve throughput, and thus performance, may include hard disk drive (HDD) or solid state drive (SSD) controllers, data centers (e.g., banking, government, health care, data processors, etc.), network concentrators, VPN tunnels, etc. In a more specific example, embodiments consistent with the present disclosure may be used to implement a National Institute of Standards and Technology (NIST) special publication (SP) 800-90A compliant AES-128 Counter mode Deterministic Random Bit Generator (CTR DRBG) to produce cryptographically secure random numbers.

Figure 2:
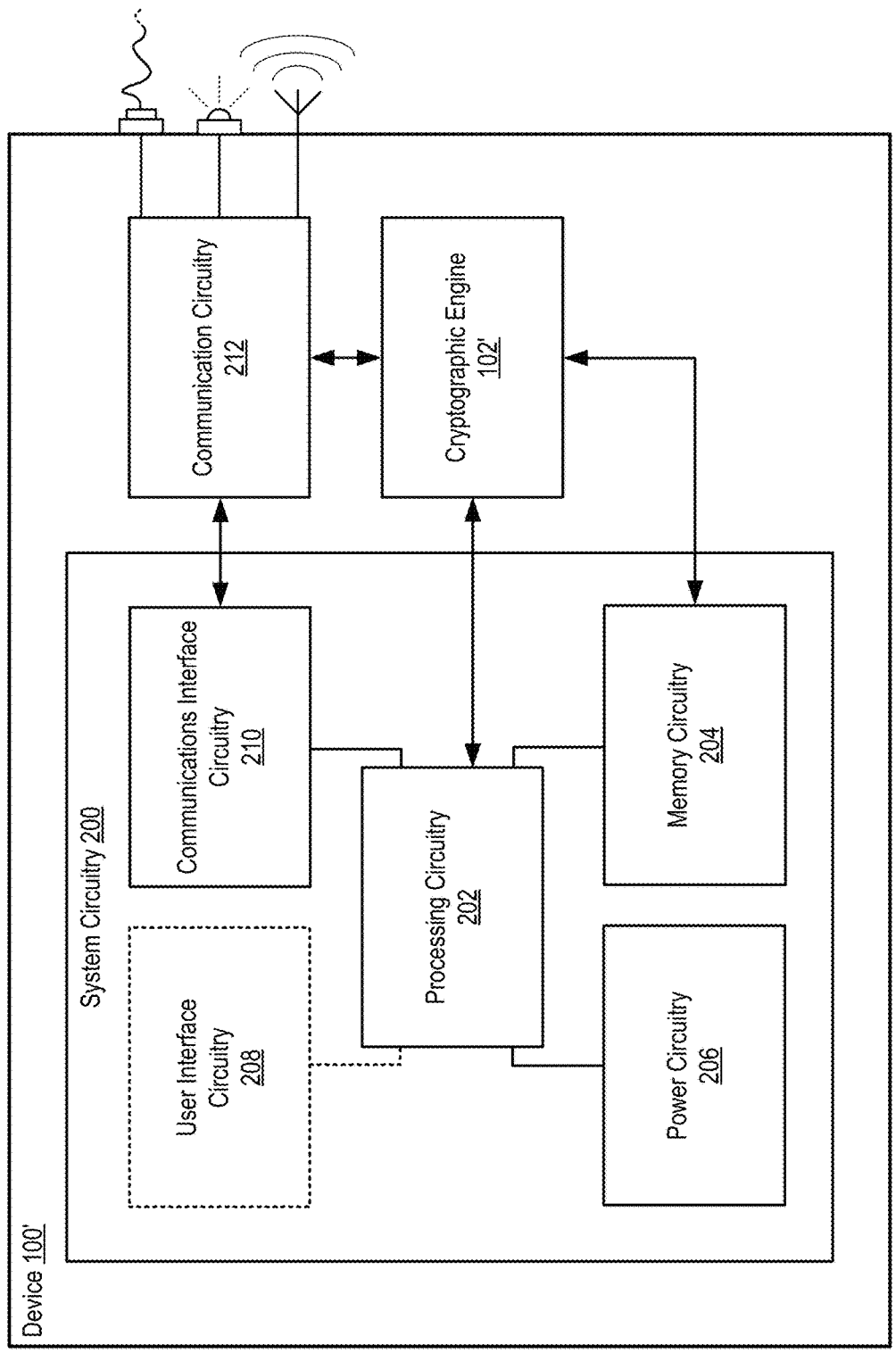
FIG. 2 illustrates an example configuration for a device usable in accordance with at least one embodiment of the present disclosure.

FIG. 2 illustrates an example configuration for a device usable in accordance with at least one embodiment of the present disclosure. The inclusion of an apostrophe after an item number (e.g., 100') in the present disclosure may indicate that an example embodiment of the particular item is being illustrated. For example, device 100' may be capable of performing any or all of the activities disclosed in FIG. 1. However, device 100' is presented herein only as an example of an apparatus usable in embodiments consistent with the present disclosure, and is not intended to limit any of the various embodiments to any particular manner of implementation.

Device 100' may comprise, for example, system circuitry 200 to manage operation of the device. Example system circuitry 200 may include processing circuitry 202, memory circuitry 204, power circuitry 206, user interface circuitry 208 and communication interface circuitry 210. Device 100' may further include communication circuitry 212 and cryptographic engine 102'. While communication circuitry 212 and cryptographic engine 102' are illustrated as separate from system circuitry 200, the example configuration shown in FIG. 2 has been provided merely for the sake of explanation. Some or all of the functionality associated with communication circuitry 212 and/or cryptographic engine 102' may also be incorporated into system circuitry 200.

In device 100', processing circuitry 202 may comprise one or more processors situated in separate components, or alternatively one or more cores in a single component (e.g., in a SoC), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing circuitry 202 may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing circuitry 202 may be configured to execute various instructions in device 100'. Instructions may include program code configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 206 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 208 may be incorporated within device 100' and/or may be coupled to device 100' via a wired or wireless communication medium. User interface circuitry 208 may be optional in certain circumstances such as, for example, a situation wherein device 100' is a server (e.g., rack server, blade server, etc.) that does not include user interface circuitry 208, and instead relies on another device (e.g., a management terminal) for user interface functionality.

Communication interface circuitry 210 may be configured to manage packet routing and other control functions for communication circuitry 212 that may include resources configured to support wired and/or wireless communications. In some instances, device 100' may comprise more than one set of communication circuitry 212 (e.g., including separate physical interface circuitry for wired protocols and/or wireless radios) managed by a centralized communication interface circuitry 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface circuitry 210 may be configured to prevent wireless communications that are active in communication circuitry 212 from interfering with each other. In performing this function, communication interface circuitry 210 may schedule activities for communication circuitry 212 based on, for example, the relative priority of messages awaiting transmission. While the embodiment disclosed in FIG. 2 illustrates communication interface circuitry 210 being separate from communication circuitry 212, the functionality of communication interface circuitry 210 and communication circuitry 212 may also be incorporated within the same circuitry.

Consistent with the present disclosure, cryptographic engine 102' may interact with at least processing circuitry 202 and memory circuitry 204 in device 100'. In an example of operation, processing circuitry 202 may cause cryptographic engine 102' to obtain input data 104A . . . n from memory circuitry 204, or alternatively, may cause memory circuitry 204 to provide input data 104A . . . n to cryptographic engine 102'. Cryptographic engine 102' may perform encryption operations 106 on input data 104A . . . n to generate output data 108A . . . n. Output data 108A . . . n may then be utilized by processing circuitry 202 and/or may be stored in memory circuitry 204. In at least one embodiment, cryptographic engine 102' may further interact with communication circuitry 212 to transmit encrypted data (e.g., ciphertext) from device 100', or to receive encrypted data into device 100', where it may be decrypted in cryptographic engine 102' prior to, for example, the encrypted data being processed by processing circuitry 202, stored by memory circuitry 204, etc.

Figure 3:
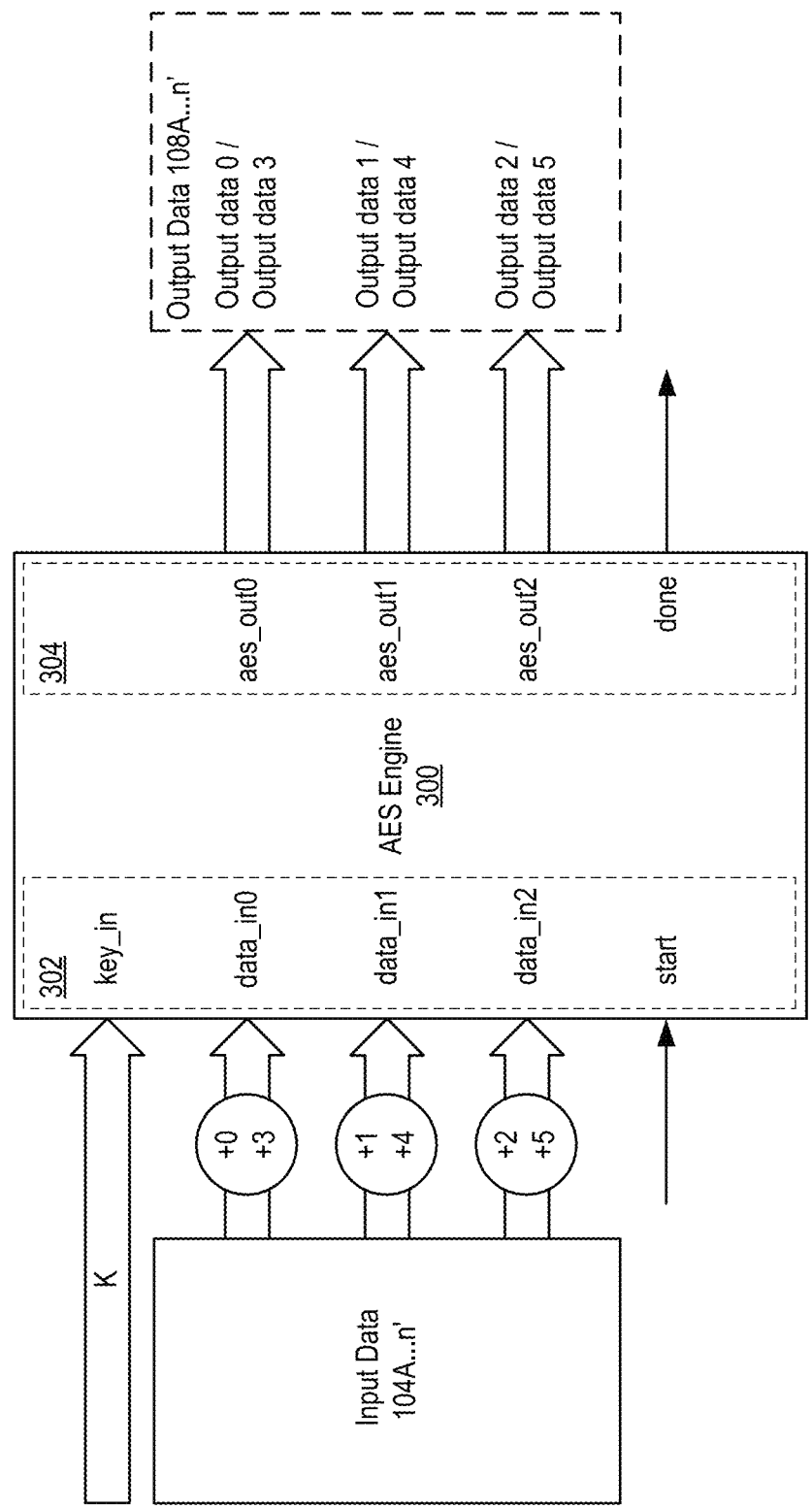
FIG. 3 illustrates an example implementation of a multiple input cryptographic engine based on the Advanced Encryption Standard (AES) in accordance with at least one embodiment of the present disclosure.

FIG. 3 illustrates an example implementation of a multiple input cryptographic engine based on AES in accordance with at least one embodiment of the present disclosure. AES engine 300 may be an example implementation of cryptographic engine 102 based on AES. AES engine 300 may receive input data 104A . . . n' via input interface 302 and output data 108A . . . n' via output interface 304. Input interface 302 may comprise, for example, key_in input to receive key data for use during encryption, data_in0, data_in1 and data_in2 inputs to receive input data 104A . . . n' and a start input to receive a signal to initiate encryption or decryption operations. Output interface 304 may comprise, for example, AES_out0, AES_out1 and AES_out0 to output output data 108A . . . n', and a done output to transmit a signal when encryption or decryption is complete. AES engine 300 may be considered a "three wide" cryptographic engine in that it may comprise cryptographic circuitry to handle three inputs from input data 104A . . . n' per AES cycle. For example, AES engine 300 may receive inputs+0, +1 and +2 (e.g., input data 104A . . . C') in a first AES cycle. In the next AES cycle, AES engine 300 may receive inputs+3, +4 and +5 (e.g., input data 104D . . . F'). When AES encryption or decryption operations are complete (e.g., typically after the tenth AES cycle), AES engine 300 may output data 0, 1 and 2 (e.g., output data 108A . . . C'). On the next cycle (e.g., the eleventh cycle), AES engine 300 may output data 3, 4 and 5 (e.g., output data 108D . . . F'). As a result, AES engine 300 may be able to generate up to six output data 108A . . . n' outputs in a full set of AES cryptographic operations plus one additional AES cycle (e.g., typically eleven AES cycles).

Figure 4:
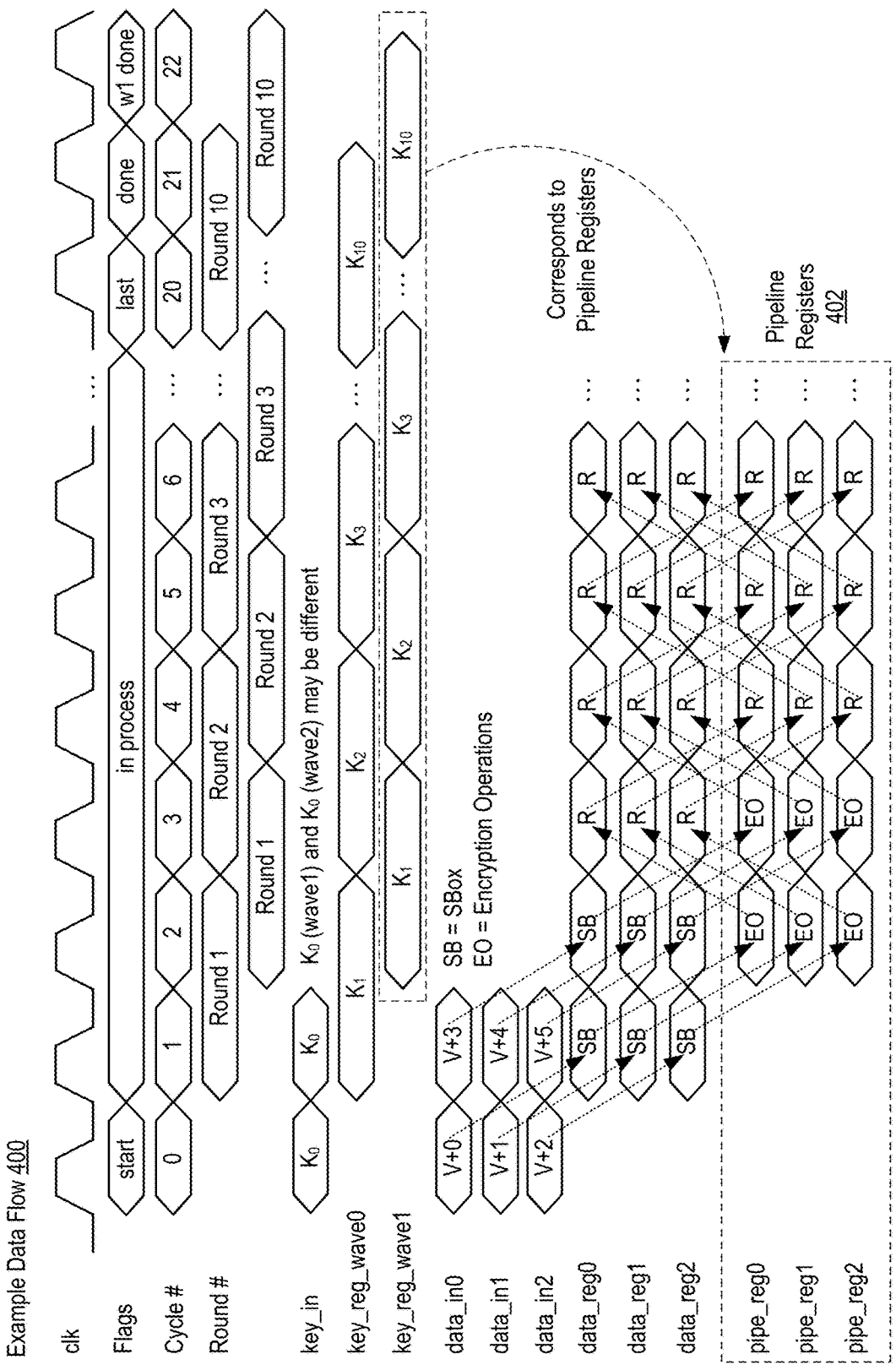
FIG. 4 illustrates example of data flow in an AES-based multiple input cryptographic engine such as disclosed in the example of FIG. 3.

FIG. 4 illustrates example of data flow in an AES-based multiple input cryptographic engine such as disclosed in the example of FIG. 3. Example data flow 400 describes various inputs into, along with timing occurring in relation to example encryption operations for, AES engine 300. Initially, the "clk" may represent system timing (e.g., for all of device 100). "Flags" may include indicators that identify the "start" to encryption operations, the last operation in the encryption process for wave 0 (e.g., input data 104A), the completion of wave 0 (e.g., "done") and completion of wave 1 (e.g., "w1 done" corresponding to the encryption of input data 104B). "Cycle #" may indicate an ordinal number of a particular AES cycle in the encryption operation. Each AES round may contain two AES cycles to account for the completion of logical operations to both wave 0 and 1. "Round #" may indicate the number of a particular round corresponding to wave 0 or wave 1.

Various indicators that track the status of keys utilized during encryption operations may comprise, for example, "key_in," "key_reg_wave0" and "key_reg_wave1." AES is a symmetric key encryption algorithm employing key lengths of 128, 192 or 256 bits. Ten cycles of repetition of transformation operations are typically required for encryption based on a 128-bit key. A series of keys may be input into AES engine 300; however, the keys do not always change from wave to wave. It is possible for the same key to be employed for encryption during wave 0 and wave 1. Following key input (e.g., "key_in") the keys may be loaded into registers (e.g., "key_reg_wave0" and "key_reg_wave1") for use during encryption. In example data flow 400, key_reg_wave1 may correspond to (e.g., may be used by) pipeline registers 402. Input data 104A . . . C (e.g., "V+0", "V+1" and "V+2") may be loaded at inputs "data_in0," "data_in1" and "data_in2" during cycle 0 of the encryption operations. In cycle 1, an SBox (SB) operation may be performed on input data 104A . . . C and stored in data registers "data_reg0," "data_reg1" and"data_reg2" while input data 104D . . . F (e.g., "V+3", "V+4" and "V+5") are loaded at inputs "data_in0," "data_in1" and "data_in2." In cycle 2, one or more encryption operations (EO) such as, but not limited to, shift rows, mix columns, add round key, etc. may be performed on input data 104A . . . C, while the SBox operation is performed on input data 104D . . . F. In subsequent cycles input data 104A . . . n may be further randomized (e.g., "R"_). Consistent with the present disclosure, pipeline registers 402 may allow data to be interleaved or "ping-ponged" back and forth so that subsequent logical operations may be performed during encryption. For example, in cycle 2 input data 104A . . . 0 may be moved into "pipe_reg0," "pipe_reg1" and "pipe_reg2" while input data 104D . . . F may be moved into "data_in0," "data_in1" and "data_in2." As illustrated in FIG. 4, pipeline registers 402 may allow the back-and-forth movement of data to facilitate the contemporaneous encryption of two sets of plaintext data. This processing may increase the utilization of logical operations within AES engine 300, and as a result, may increase the data encryption throughput and efficiency of AES engine 300.

Example data flow 400 in FIG. 4 may also be applicable to decryption operations. In a similar manner, a first set of encrypted data may be received in data_in0, data_in1 and data_in2 in cycle 0. When the first set of encrypted data is moved to pipe_reg0, pipe_reg1 and pipe_reg2 in cycle 1, a second set of encrypted data may be received into data_in0, data_in1 and data_in2. The order, type, frequency etc. of logical operations performed as the encrypted data moves back and forth between registers may differ between encryption and decryption, and may depend on, for example, the type of data encryption/decryption being used. When all decryption operations are done, decrypted data may be output from example data flow 400 (e.g., from output interface 304). For example, the decrypted data may be provided to processing circuitry 202 for use in a processing task in device 100', to memory circuitry 204 for temporary or permanent storage, etc.

Figure 5:
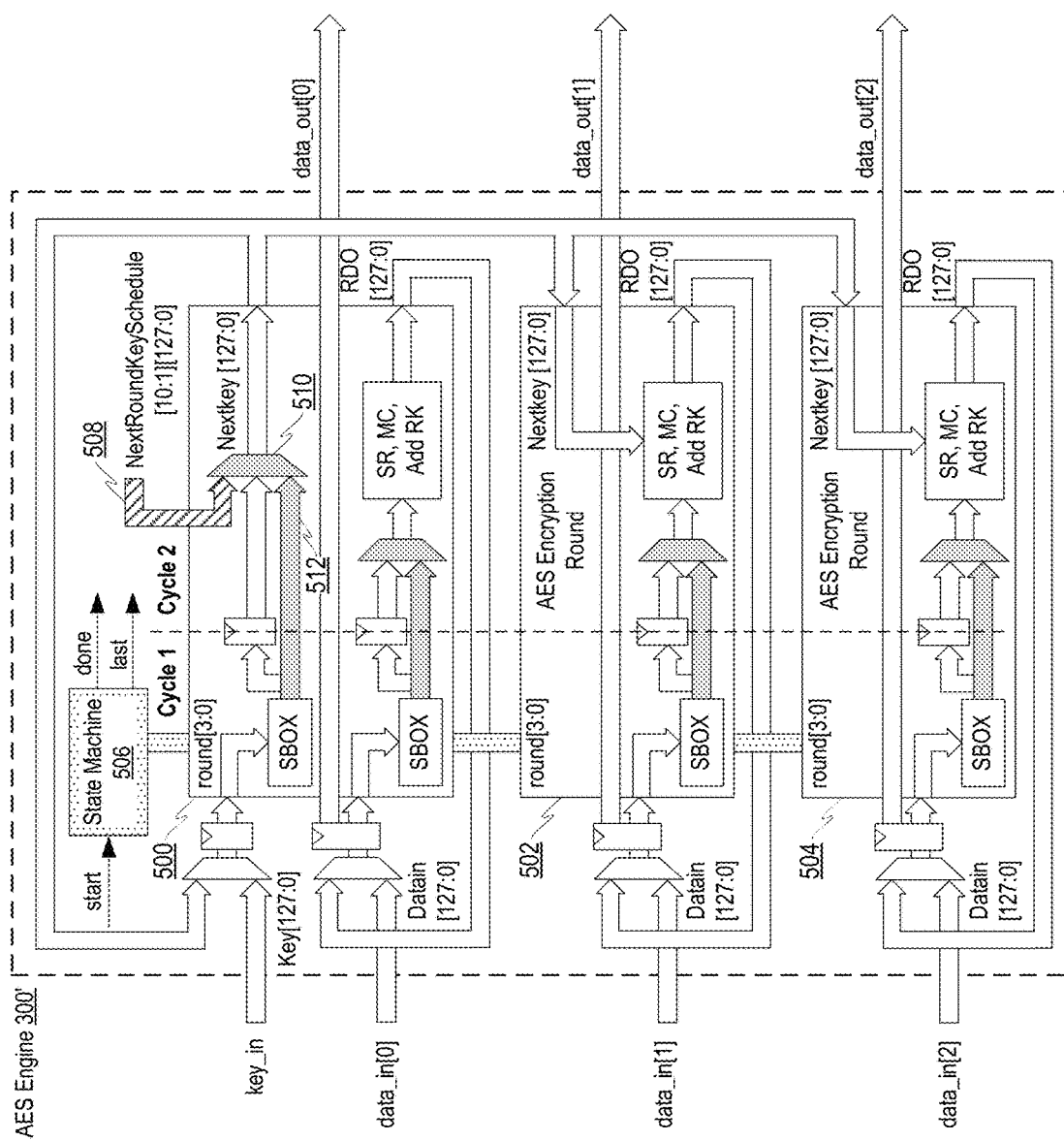
FIG. 5 illustrates example of structure and power conservation features in an AES-based multiple input cryptographic engine such as disclosed in the example of FIG. 3.

FIG. 5 illustrates example of structure and power conservation features in an AES-based multiple input cryptographic engine such as disclosed in the example of FIG. 3. AES engine 300' may comprise at least cryptographic circuitry 500 and additional cryptographic circuitry 502 and 504. State machine 506 may coordinate the operation of cryptographic circuitry 502 to 504. Cryptographic circuitry 500 to 504 may comprise various logical operators and data handling resources that may be used for encrypting plaintext data. Logical operators may include, for example, the "S-BOX," shift rows "SR," mix columns "MC," add round key "Add RK," etc., while data handling resources are illustrated as the various arrows that move and store data within AES engine 300'.

In at least one embodiment, certain features may be deactivated within AES engine 300' when not in use to conserve power by, for example, power management circuitry (not shown) in AES engine 300'. For example, the power management circuitry may exist within AES engine 300' itself or in other circuitry within device 100 (e.g., in processing circuitry 202 as dedicated circuitry or as an application that reconfigures processing circuitry 203 into specialized circuitry for power management). The power management circuitry may monitor the operation of AES engine 300' (e.g., may monitor at least input data 104A . . . n) and may then enable/disable features based on usage. For example, if it is determined that wave 1 will use the same key data as wave 0, a clock to the key pipeline register may be disabled for that AES computation as shown at 508. If the key is constant or changes infrequently, a key schedule received in AES engine 300' need not be re-computed over and over again. This means that the key schedule register (e.g., including the key pipeline register) may be clock-gated. Alone or in combination with the above, if any of the parallel data paths (e.g., additional cryptographic circuitry 502 and/or 504) are not in use, the clock to the data and pipeline registers for unused data paths may be deactivated. This may result in there being minimal toggling in the combinational logic for the round (e.g., only the Add RK logical operator may toggle as the key for the round moves to the next key in the key schedule). Moreover, if wave 1 is not in use at all (e.g., only wave 0 is receiving input data 104A . . . n), the clock to the pipeline registers for all data paths and the key schedule may be disabled. Instead, multiplexer 510 (e.g., a multicycle path (MCP) bypass mux) following the pipeline register may select the SBOX output 512. The control logic may then hold the input stable for two cycles, resulting in a two-cycle multicycle path override for timing convergence with the clocking of device 100 (e.g., a result for the input data being encrypted may be held an additional cycle so that is finishes at the correct time with respect to the timing in device 100).

Figure 6:
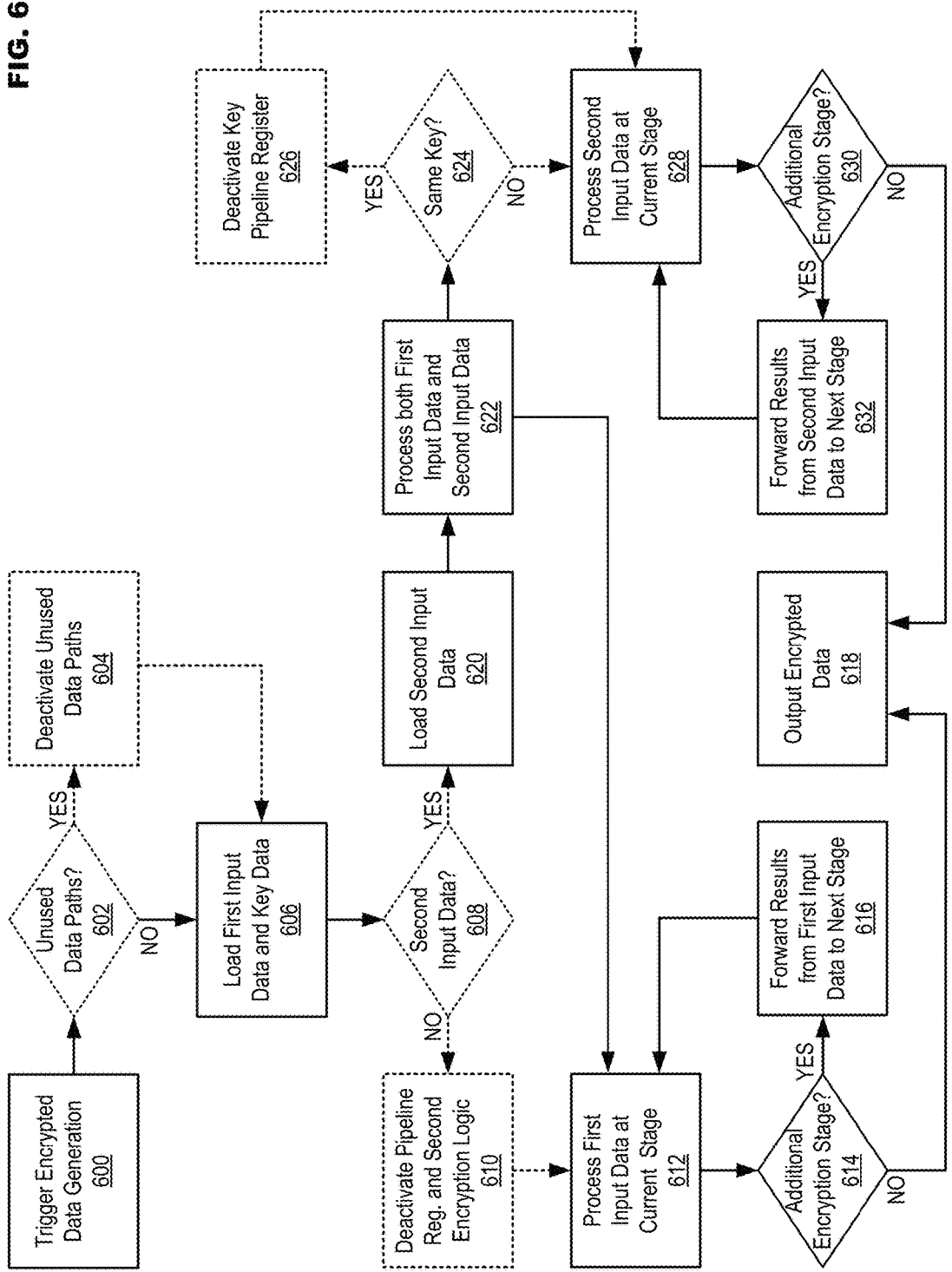
FIG. 6 illustrates example operations for data encryption in accordance with at least one embodiment of the present disclosure.

FIG. 6 illustrates example operations for data encryption in accordance with at least one embodiment of the present disclosure. Operations illustrated within dotted lines in FIG. 6 may pertain to optional power conservation features. These features may be optional in that they are not required for the depicted embodiment of the present disclosure. Encrypted data generation may be triggered in an cryptographic engine in operation 600 (e.g., by processing circuitry in the same device). A determination may be made in operation 602 as to whether there will be unused data paths during the triggered encryption operation. If in operation 602 it is determined that there will be unused data paths, then any unused data paths may be deactivated in operation 604. Following a determination in operation 602 that there are no unused data paths, or alternatively following operation 604, first input data and key data may be loaded into the cryptographic engine in operation 606.

A determination may be made in operation 608 as to whether there will be second input data in the encryption cycle following the loading of the first encryption data. If in operation 608 it is determined that there will not be a second input, then in operation 610 the key pipeline register (e.g., pipeline reg.) and the second input data encryption logic (e.g., second encryption logic) may be deactivated. In operation 612 the first input data may be processed at the current stage of encryption, and in operation 614 a determination may then be made as to whether there are additional stages including encryption operations to be performed on the first input data. If in operation 614 it is determined that there are additional encryption stages, then in operation 616 the results of the first input data from the current stage may be forwarded to the next stage of encryption. Operation 616 may be followed by a return to operation 612 to perform data processing at the current stage of encryption. A determination in operation 614 that there are no further stages of encryption to perform may be followed by operation 618 wherein encrypted data based on the first data input may be output (e.g., first encrypted data).

Returning to operation 608, a determination that there will be second data input may be followed by operation 620 wherein second input data is loaded. Following operation 622, both first and second input data encryption will be performed. The first input data may be encrypted in operations 612 to 618 as described above. A determination may be made in operation 624 as to whether the first and second input data encryption will utilize the same key. If in operation 624 it is determined that both first and second input data encryption will utilize the same key, then in operation 626 the key pipeline register may be deactivated. Following a determination in operation 624 that the same key will not be used to process the first and second input data, or else following operation 626, in operation 628 the second input data may be processed at the current stage of encryption. A determination may then be made in operation 630 as to whether there are additional stages including encryption operations to be performed on the second input data. If in operation 630 it is determined that there are additional encryption stages, then in operation 632 the results of the second input data from the current stage may be forwarded to the next stage of encryption. Operation 632 may be followed by a return to operation 628 to perform data processing at the current stage of encryption. A determination in operation 630 that there are no further stages of encryption to perform may be followed by operation 618 wherein encrypted data based on the second data input may be output (e.g., second encrypted data). The operations disclosed in FIG. 6 may be equally applicable to decryption as well as encryption. In particular, decryption-related terminology may be substituted for encryption-related terminology in operations 600 to 632 to result in an operational flow for use when decrypting encrypted data.

While FIG. 6 illustrates operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a multiple input cryptographic engine. In general, an cryptographic engine consistent with the present disclosure may improve on existing systems that generate encrypted data (e.g., ciphertext) from decrypted input data (e.g., plaintext), or that conversely generate decrypted data from encrypted data, in that a second input may be received into the cryptographic engine while a first input is still being processed, allowing multiple inputs to be processed concurrently. An example device may include an input interface to receive data into the device, an output interface to output data from the device and cryptographic circuitry. The cryptographic circuitry may be configured encrypt/decrypt data received via the input interface into encrypted/decrypted data while also converting a least a portion of a second input received via the input interface into second encrypted/decrypted data. The encrypted/decrypted data may then be output via the output interface.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a flexible counter system including a multiple input cryptographic engine.

According to example 1 there is provided at least one cryptographic device. The at least one device may comprise an input interface, an output interface and cryptographic circuitry to receive at least first input data and second input data via the input interface, convert the first input data into first encrypted data while also converting at least a portion of the second input data into second encrypted data and output at least the first encrypted data and the second encrypted data via the output interface.

Example 2 may include the elements of example 1, wherein the cryptographic circuitry converts the first input data and the second input data based on the Advanced Encryption Standard (AES).

Example 3 may include the elements of example 2, wherein the at least one device is an AES-128 Counter mode Deterministic Random Bit Generator (CTR DRBG) to produce cryptographically secure random numbers.

Example 4 may include the elements of any of examples 1 to 3, wherein the input interface is to receive at least key data, the first input data and the second input data.

Example 5 may include the elements of example 4, wherein the cryptographic circuitry comprises at least logical operators to generate the first encrypted data by performing a series of logical operations on the first input data based on first key data, and generate the second encrypted data by performing a series of logical operations on the second input data based on second key data.

Example 6 may include the elements of example 5, wherein the cryptographic circuitry comprises at least data handling resources including at least one data register to allow the cryptographic circuitry to perform a logical operation on the first input data while also performing a different logical operation on the second input data.

Example 7 may include the elements of example 6, and may further comprise key data handling resources to manage the first key data and the second key data and power management circuitry to deactivate at least the key data handling resources when the first key data and the second key data are determined to be the same.

Example 8 may include the elements of example 7, wherein the power management circuitry is to deactivate at least one of the logical operators or the data handling resources corresponding to the second input data when the second input data is not received via the input interface.

Example 9 may include the elements of any of examples 1 to 8, and may further comprise at least one additional cryptographic circuitry.

Example 10 may include the elements of example 9, wherein the input interface is to receive at least additional first input data and additional second input data corresponding to each additional cryptographic circuitry and the output interface is to output at least first additional encrypted data and second additional encrypted data corresponding to each additional cryptographic circuitry.

Example 11 may include the elements of any of examples 9 to 10, and may further comprise power management circuitry to disable at least one additional cryptographic circuitry when the additional first input data and the additional second input data corresponding to the at least one additional cryptographic circuitry is not received.

Example 12 may include the elements of any of examples 1 to 11, wherein the cryptographic circuitry is to receive at least first encrypted data and second encrypted data via the input interface, convert the first encrypted data into first decrypted data while also converting at least a portion of the second encrypted data into second decrypted data and output at least the first decrypted data and the second decrypted data via the output interface.

Example 13 may include the elements of any of examples 1 to 12, wherein the cryptographic circuitry comprises at least logical operators to generate the first encrypted data by performing a series of logical operations on the first input data based on first key data, and generate the second encrypted data by performing a series of logical operations on the second input data based on second key data and data handling resources including at least one data register to allow the cryptographic circuitry to perform a logical operation on the first input data while also performing a different logical operation on the second input data.

Example 14 may include the elements of example 13, and may further comprise key data handling resources to manage the first key data and the second key data and power management circuitry to deactivate at least the key data handling resources when the first key data and the second key data are determined to be the same and to deactivate at least one of the logical operators or the data handling resources corresponding to the second input data when the second input data is not received via the input interface.

Example 15 may include the elements of any of examples 1 to 14, and may further comprise at least one additional cryptographic circuitry, wherein the input interface is to receive at least additional first input data and additional second input data corresponding to each additional cryptographic circuitry and the output interface is to output at least first additional encrypted data and second additional encrypted data corresponding to each additional cryptographic circuitry.

According to example 16 there is provided a system capable of cryptography. The system may comprise processing circuitry to at least trigger cryptographic operations, memory circuitry to store at least input data and output data and at least one cryptographic device including an input interface, an output interface and cryptographic circuitry to receive at least first input data and second input data via the input interface, convert the first input data into first encrypted data while also converting at least a portion of the second input data into second encrypted data and output at least the first encrypted data and the second encrypted data via the output interface.

Example 17 may include the elements of example 16, wherein the cryptographic circuitry converts the first input data and the second input data based on the Advanced Encryption Standard (AES).

Example 18 may include the elements of example 17, wherein the cryptographic device is an AES-128 Counter mode Deterministic Random Bit Generator (CTR DRBG) to produce cryptographically secure random numbers.

Example 19 may include the elements of any of examples 16 to 18, wherein the cryptographic circuitry comprises logical operators to generate the first encrypted data by performing a series of logical operations on the first input data based on first key data, and generate the second encrypted data by performing a series of logical operations on the second input data based on second key data and data handling resources including at least one data register to allow the cryptographic circuitry to perform a logical operation on the first input data while also performing a different logical operation on the second input data.

Example 20 may include the elements of any of examples 16 to 19, wherein the cryptographic circuitry is to receive at least first encrypted data and second encrypted data via the input interface, convert the first encrypted data into first decrypted data while also converting at least a portion of the second encrypted data into second decrypted data and output at least the first decrypted data and the second decrypted data via the output interface.

According to example 21 there is provided a method for cryptography. The method may comprise triggering data encryption in at least one device, receiving first input data into the at least one device, determining if second input data is to be received into the at least one device, if it is determined that the second input data is to be received, receiving the second input data into the at least one device, converting the first input data into first encrypted data while also converting at least a portion of the second input data into second encrypted data and outputting at least the first encrypted data and the second encrypted data from the at least one device.

Example 22 may include the elements of example 21, wherein converting the first input data and the second input data is based on the Advanced Encryption Standard (AES).

Example 23 may include the elements of any of examples 21 to 22, and may further comprise determining whether data paths in the at least one device will be unused and deactivating unused data paths in the at least one device based on the determination.

Example 24 may include the elements of any of examples 21 to 23, and may further comprise, if it is determined that the second data input will not be received, deactivating at least one of logical operators or data handling resources corresponding to the second input data in the at least one device.

Example 25 may include the elements of any of examples 21 to 24, wherein converting the first and second encryption data comprises generating the first encrypted data by performing a series of logical operations on the first input data based on first key data, and generating the second encrypted data by performing a series of logical operations on the second input data based on second key data.

Example 26 may include the elements of example 25, and may further comprise determining if the first key data is the same as the second key data and deactivating at least key data handling resources in the at least one device when the first key data and the second key data are determined to be the same.

Example 27 may include the elements of any of examples 21 to 26, and may further comprise triggering data decryption in the at least one device, receiving first encrypted data into the at least one device, determining if second encrypted data is to be received into the at least one device, if it is determined that the second encrypted data is to be received, receiving the second encrypted data into the at least one device, converting the first encrypted data into first decrypted data while also converting at least a portion of the second encrypted data into second decrypted data and outputting at least the first decrypted data and the second decrypted data from the at least one device.

Example 28 may include the elements of any of examples 21 to 27, and may further comprise determining whether data paths in the at least one device will be unused, deactivating unused data paths in the at least one device based on the determination, and if it is determined that the second data input will not be received, deactivating at least one of logical operators or data handling resources corresponding to the second input data in the at least one device.

According to example 29 there is provided a system including at least a device, the system being arranged to perform the method of any of the above examples 21 to 28.

According to example 30 there is provided a chipset arranged to perform the method of any of the above examples 21 to 28.

According to example 31 there is provided at least one machine readable medium comprising a plurality of instructions that, in response to be being executed on a computing device, cause the computing device to carry out the method according to any of the above examples 21 to 28.

According to example 32 there is provided at least one device for at least data encryption, the at least one device being arranged to perform the method of any of the above examples 21 to 28.

According to example 33 there is provided a system capable of cryptography. The system may comprise means for triggering data encryption in at least one device, means for receiving first input data into the at least one device, means for determining if second input data is to be received into the at least one device, means for, if it is determined that the second input data is to be received, receiving the second input data into the at least one device, means for converting the first input data into first encrypted data while also converting at least a portion of the second input data into second encrypted data and means for outputting at least the first encrypted data and the second encrypted data from the at least one device.

Example 34 may include the elements of example 33, wherein the means for converting the first input data and the second input data are based on the Advanced Encryption Standard (AES).

Example 35 may include the elements of any of examples 33 to 34, and may further comprise means for determining whether data paths in the at least one device will be unused and means for deactivating unused data paths in the at least one device based on the determination.

Example 36 may include the elements of any of examples 33 to 35, and may further comprise means for, if it is determined that the second data input will not be received, deactivating at least one of logical operators or data handling resources corresponding to the second input data in the at least one device.

Example 37 may include the elements of any of examples 33 to 36, wherein the means for converting the first and second encryption data comprise means for generating the first encrypted data by performing a series of logical operations on the first input data based on first key data, and generate the second encrypted data by performing a series of logical operations on the second input data based on second key data.

Example 38 may include the elements of example 37, and may further comprise means for determining if the first key data is the same as the second key data and means for deactivating at least key data handling resources in the at least one device when the first key data and the second key data are determined to be the same.

Example 39 may include the elements of any of examples 33 to 38, and may further comprise means for triggering data decryption in the at least one device, means for receiving first encrypted data into the at least one device, means for determining if second encrypted data is to be received into the at least one device, means for, if it is determined that the second encrypted data is to be received, receiving the second encrypted data into the at least one device, means for converting the first encrypted data into first decrypted data while also converting at least a portion of the second encrypted data into second decrypted data and means for outputting at least the first decrypted data and the second decrypted data from the at least one device.

Example 40 may include the elements of any of examples 33 to 39, and may further comprise determining whether data paths in the at least one device will be unused, deactivating unused data paths in the at least one device based on the determination and if it is determined that the second data input will not be received, deactivating at least one of logical operators or data handling resources corresponding to the second input data in the at least one device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. At least one cryptographic device for performing advanced encryption standard (AES) cryptography, comprising:
   an input interface;
   an output interface;
   a data register;
   a pipeline register; and
   cryptographic circuitry comprising a single cryptographic engine to:
     receive, during a first AES cycle, first input data via the input interface;
     during a second AES cycle that is the next AES cycle after the first AES cycle:
       perform a first AES cryptographic operation on the first input data, while receiving second input data via the input interface; and
       store an output of the first AES cryptographic operation in the data register;
     during a third AES cycle that is the next AES cycle after the second AES cycle:
       perform a second AES cryptographic operation on data in the data register, while contemporaneously performing said first AES cryptographic operation on the second input data, wherein the second AES cryptographic operation differs from the first AES cryptographic operation;
       store an output of the second AES cryptographic operation in the pipeline register; and
       store an output of the of the first AES cryptographic operation on the second input data in the data register;
     during each of a plurality of subsequent AES cycles following the third AES cycle:
       contemporaneously perform different AES cryptographic operations on data in the data register and data in the pipeline register;
       store an output of an AES cryptographic operation on data in the data register to the pipeline register and
       store an output of an AES cryptographic operation on data in the pipeline register;
     output, via the output interface, first AES encrypted data during a fourth AES cycle and second AES encrypted data during a fifth AES cycle, wherein:
       the fourth AES cycle is after the third AES cycle, the fifth AES cycle is the next AES cycle after the fourth AES cycle, and the fourth and fifth AES cycles are after said plurality of subsequent AES cycles;
       the first AES encrypted data was produced from the first input data; and
       the second AES encrypted data was produced from the second input data.

2. The at least one device of claim 1, wherein the input interface is further to receive first key data and second key data.

3. The at least one device of claim 2, wherein the cryptographic circuitry comprises at least logical operators to generate the first AES encrypted data using the first key data, and generate the second AES encrypted data using the second key data.

4. The at least one device of claim 3, further comprising:
   key data handling resources to manage the first key data and the second key data; and
   power management circuitry to deactivate at least the key data handling resources when the first key data and the second key data are determined to be the same.

5. The at least one device of claim 4, wherein the power management circuitry is to deactivate at least a portion of the cryptographic device when the second input data is not received via the input interface.

6. The at least one device of claim 1, further comprising at least one additional cryptographic circuitry.

7. The at least one device of claim 1, wherein the cryptographic circuitry is to output said first AES encrypted data after 10 AES cycles following reception of the first input data, and to output said second AES encrypted data after 11 AES cycles following reception of the second input data.

8. The at least one device of claim 4, wherein said key data handling resources comprise a key register.

9. A system capable of Advanced Encryption Standard (AES) cryptography, comprising:
   processing circuitry to at least trigger AES cryptographic operations;
   memory circuitry to store data; and
   at least one cryptographic device including:
      an input interface;
      an output interface;
      a data register; and
      a pipeline register; and
      cryptographic circuitry comprising a single cryptographic engine to:
         receive, during a first AES cycle, first input data via the input interface:
         during a second AES cycle that is the next AES cycle after the first AES cycle:
            perform a first AES cryptographic operation on the first input data, while receiving second input data via the input interface; and
            store an output of the first AES cryptographic operation in the data register;
         during a third AES cycle that is the next AES cycle after the second AES cycle:
            perform a second AES cryptographic operation on data in the data register, while contemporaneously performing said first AES cryptographic operation on the second input data, wherein the second AES cryptographic operation differs from the first AES cryptographic operation;
            store an output of the second AES cryptographic operation in the pipeline register; and
            store an output of the of the first AES cryptographic operation on the second input data in the data register:
         during each of a plurality of subsequent AES cycles following the third AES cycle:
            contemporaneously perform different AES cryptographic operations on data in the data register and data in the pipeline register;
            store an output of an AES cryptographic operation on data in the data register to the pipeline register and
            store an output of an AES cryptographic operation on data in the pipeline register;
         output, via the output interface, first AES encrypted data during a fourth AES cycle and second AES encrypted data during a fifth AES cycle, wherein:
            the fourth AES cycle is after the third AES cycle, the fifth AES cycle is the next AES cycle after the fourth AES cycle, and the fourth and fifth AES cycles are after said plurality of subsequent AES cycles;
            the first AES encrypted data was produced from the first input data; and
            the second AES encrypted data was produced from the second input data.

10. The system of claim 9, wherein the input interfaced is further to receive first key data and second key data, and cryptographic circuitry is to produce the first AES encrypted data using the first key data and to produce the second AES encrypted data using the second key data.

11. A method for cryptography, comprising, with a cryptographic device comprising an input interface, an output interface, a data register, a pipeline register and cryptographic circuitry comprising a single cryptographic engine, the cryptographic device to perform advanced encryption standard (AES cryptography):
   receiving, during a first AES cycle, first input data via the input interface;
   during a second AES cycle that is the next AES cycle after the first AES cycle:
      performing a first AES cryptographic operation on the first input data, while receiving second input data via the input interface; and
      storing an output of the first AES cryptographic operation in the data register;
   during a third AES cycle that is the next AES cycle after the second AES cycle:
      performing a second AES cryptographic operation on data in the data register, while contemporaneously performing said first AES cryptographic operation on the second input data, wherein the second AES cryptographic operation differs from the first AES cryptographic operation;
      storing an output of the second AES cryptographic operation in the pipeline register; and
      storing an output of the of the first AES cryptographic operation on the second input data in the data register;
   during each of a plurality of subsequent AES cycles following the third AES cycle:
      contemporaneously performing different AES cryptographic operations on data in the data register and data in the pipeline register;
      storing an output of an AES cryptographic operation on data in the register to the pipeline register and
      storing an output of an AES cryptographic operation on data in the pipeline register; and
   outputting, via the output interface, first AES encrypted data during a fourth AES cycle and second AES encrypted data during a fifth AES cycle, wherein:
      the fourth AES cycle is after the third AES cycle, the fifth AES cycle is the next AES cycle after the fourth AES cycle, and the fourth and fifth AES cycles are after said plurality of subsequent AES cycles;
      the first AES encrypted data was produced from the first input data; and
      the second AES encrypted data was produced from the second input data.

12. The method of claim 11, further comprising:
   determining whether data paths in the cryptographic device will be unused; and
   deactivating unused data paths in the cryptographic device based on the determination.

13. The method of claim 11, further comprising:
   determining, during said first AES cycle, whether said second input data will be received; and
   when it is determined that the second input data will not be received, deactivating at least a portion of the cryptographic device.

14. The method of claim 11, further comprising receiving first key data and second key data, wherein the first AES encrypted data is produced using the first key data, and the second AES encrypted data is produced using the second key data.

15. The method of claim 14, further comprising:
   determining whether the first key data is the same as the second key data; and when it is determined that the first key data is the same as the second key data, deactivating at least key data handling resources in the cryptographic device.

16. The method of claim 11, wherein the cryptographic circuitry is to output said first AES encrypted data after 10 AES cycles following reception of the first input data, and to output said second AES encrypted data after 11 AES cycles following reception of the second input data.

17. At least one non-transitory computer readable medium having stored thereon, individually or in combination, instructions for cryptography that, when executed by one or more processors, cause the one or more processors to:
trigger advanced encryption standard (AES) data encryption in a cryptographic device comprising an input interface, an output interface, a data register, a pipeline register and cryptographic circuitry comprising a single cryptographic engine, the cryptographic device to perform advanced encryption standard (AES cryptography), said AES data encryption comprising:
receiving, during a first AES cycle, first input data via the input interface;
during a second AES cycle that is the next AES cycle after the first AES cycle:
performing a first AES cryptographic operation on the first input data, while receiving second input data via the input interface; and
storing an output of the first AES cryptographic operation in the data register;
during a third AES cycle that is the next AES cycle after the second AES cycle:
performing a second AES cryptographic operation on data in the data register, while contemporaneously performing said first AES cryptographic operation on the second input data, wherein the second AES cryptographic operation differs from the first AES cryptographic operation;
storing an output of the second AES cryptographic operation in the pipeline register; and
storing an output of the of the first AES cryptographic operation on the second input data in the data register;
during each of a plurality of subsequent AES cycles following the third AES cycle:
contemporaneously performing different AES cryptographic operations on data in the data register and data in the pipeline register;
storing an output of an AES cryptographic operation on data in the data register to the pipeline register and storing an output of an AES cryptographic operation on data in the pipeline register; and outputting, via the output interface, first AES encrypted data during a fourth AES cycle and second AES encrypted data during a fifth AES cycle, wherein:
the fourth AES cycle is after the third AES cycle, the fifth AES cycle is the next AES cycle after the fourth AES cycle, and the fourth and fifth AES cycles are after said plurality of subsequent AES cycles;
the first AES encrypted data was produced from the first input data; and
the second AES encrypted data was produced from the second input data.

18. The non-transitory computer readable mediums of claim 17, further comprising instructions that, when executed by one or more processors, cause the one or more processors to:
determine whether data paths in the cryptographic device will be unused; and
deactivate unused data paths in the cryptographic device based on the determination.

19. The non-transitory computer readable medium of claim 17, further comprising instructions that, when executed by one or more processors, cause the one or more processors to:
when it is determined that the second data input will not be received, deactivate at least a portion of the cryptographic device.

20. The non-transitory computer readable medium of claim 17, wherein said instructions when executed further cause said processor to cause said cryptographic device to receive first key data and second key data, wherein the first AES encrypted data is produced using the first key data, and the second AES encrypted data is produced using the second key data.

21. The non-transitory computer readable medium of claim 20, further comprising instructions that, when executed by one or more processors, cause the one or more processors to:
determine if the first key data is the same as the second key data; and
deactivate at least key data handling resources in the cryptography device when the first key data and the second key data are determined to be the same.

22. The non-transitory computer readable medium of claim 17, wherein the cryptographic circuitry is to output said first AES encrypted data after 10 AES cycles following reception of the first input data, and to output said second AES encrypted data after 11 AES cycles following reception of the second input data.

* * * * *